(12) United States Patent
Ryu et al.

(10) Patent No.: US 7,734,314 B2
(45) Date of Patent: Jun. 8, 2010

(54) SLIM TYPE PORTABLE TERMINAL

(75) Inventors: Shin-Dong Ryu, Daejeon (KR); Hyun-Jae Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 875 days.

(21) Appl. No.: 11/453,851

(22) Filed: Jun. 16, 2006

(65) Prior Publication Data

US 2007/0230096 A1   Oct. 4, 2007

(30) Foreign Application Priority Data

Apr. 3, 2006 (KR) .................. 10-2006-0030328

(51) Int. Cl.
*H04M 1/00* (2006.01)
(52) U.S. Cl. .................. 455/566; 455/575.1; 455/90.2
(58) Field of Classification Search .................. None
See application file for complete search history.

(56) References Cited

U.S. PATENT DOCUMENTS 6,307,751 B1 * 10/2001 Bodony et al. ............. 361/749
7,403,160 B2 *  7/2008 Chiang et al. ............. 343/702
2002/0044136 A1 *  4/2002 Griffin et al. ............. 345/169
2002/0119801 A1 *  8/2002 Nemoto et al. ............. 455/550
2003/0081375 A1    5/2003 Yamamoto
2004/0066549 A1 *  4/2004 Kiehne et al. ............. 359/254
2004/0090552 A1    5/2004 Watanabe et al.
2004/0162036 A1    8/2004 Park
2005/0153727 A1 *  7/2005 Li ............................. 455/550.1
2005/0190291 A1 *  9/2005 Kota et al. ................. 348/376
2006/0033837 A1    2/2006 Kwon

FOREIGN PATENT DOCUMENTS

| CN | 2417640 Y  | 1/2001 |
| CN | 1330497 A  | 1/2002 |
| CN | 1662017 A  | 8/2005 |
| EP | 1422911 A2 | 5/2004 |

* cited by examiner

*Primary Examiner*—Erika A Gary
(74) *Attorney, Agent, or Firm*—Roylance, Abrams, Berdo & Goodman, LLP

(57) ABSTRACT

A slim type portable terminal is provided comprising a first housing on which a keypad and a microphone unit are arranged, and a second housing comprising a liquid crystal display unit and a speaker unit, in which a printed circuit board is disposed adjacent to the liquid crystal display unit and arranged side by side with the liquid crystal display unit on a co-planar surface, and a buffer member is attached to an upper surface of the liquid crystal display unit, through which a flexible circuit provided to the terminal extends.

8 Claims, 5 Drawing Sheets

SLIM TYPE PORTABLE TERMINAL

CROSS-REFERENCE TO RELATED PATENT APPLICATIONS

This application claims the benefit under 35 U.S.C. §119 (a) of a Korean Patent Application filed with the Korean Intellectual Property Office on Apr. 3, 2006 and assigned Ser. No. 2006-30328, the entire disclosure of which is hereby incorporated by reference.

BACKGROUND OF THE INVENTION

1. Field of the Invention

The present invention relates to a slim type portable terminal. More particularly, the present invention relates to a slim type portable terminal which has a reduced thickness, thereby achieving the slimness thereof.

2. Description of the Related Art

In general, a "portable communication terminal" refers to an electronic device which a user can carry while wirelessly communicating with another user. Such a portable communication terminal includes hand-held phones, CT-2 cellular phones, digital phones, Personal Communication Service phones (PCS phones), Personal Digital Assistants (PDAs), and the like. Conventional portable terminals may be classified into various types according to their appearance, such as bar-type portable terminals, flip-type portable terminals, and folder-type portable terminals. The bar-type portable terminal has a single housing shaped like a bar. The flip-type portable terminal has a flip panel or a cover which is pivotably mounted to a bar-shaped housing by a hinge unit. The folder-type portable terminal has a folder coupled to a single bar-shaped housing by a hinge unit in such a manner that the folder can rotate in order to be folded on or unfolded from the housing.

Further, portable terminals may be classified as rotation-type terminals and sliding-type terminals according to the methods of opening and closing the terminals. In the rotation-type portable terminal, two housings are coupled to each other in such a manner that one housing rotates to be opened or closed relative to the other while the two are facing each other. In the sliding-type portable terminal, two housings are coupled to each other in a manner that one housing slides to be opened or closed relative to the other. The various classifications of portable terminals are easily understood by those skilled in the art. On the other hand, the listed conventional portable terminals indispensably include an antenna unit, data input/output unit, and data transmission and reception unit. A keypad, which a user pushes with his/her fingers to input data, is generally used as the data input unit. Further, a touch pad or a touch screen may be used as the data input unit.

In addition, a liquid crystal display is generally used to display data in order to output the data. Further, the conventional portable communication terminal is provided with a camera lens for pictures in order to perform an image communication. Thus, a user can perform image communication with another user using the portable terminal having the camera lens, or take a picture of any object.

For example, as shown in FIG. 1, a sliding type portable terminal 10 among the various types of the portable terminals will be described.

The sliding type portable terminal 10 includes a body housing 20, and a sliding housing 30 sliding by a predetermined distance along the body housing 20 in a lengthwise direction, which has an advantage of satisfying users' various tastes.

The sliding type portable terminal 10 includes a body housing 20 and a sliding housing 30 sliding upward or downward with respect to the body housing 20, by a half length of the body housing 20 to be open. The sliding housing 30 includes a sliding keypad 31, liquid crystal display unit (LCD) 32 for displaying data, and speaker unit 33, all of which are mounted on a surface thereof, while the body housing 20 has a body keypad 21 of 3×4 metrics and microphone unit 22 which are provided therefor.

As shown in FIGS. 2 and 3, such a sliding type portable terminal 10 has a following structure.

The sliding type housing 30 includes a front cover 30a and a rear cover (not shown). A printed circuit board (PCB) 34 for the liquid crystal display unit (LCD) 32 is mounted in the front cover 30a.

The liquid crystal display unit 32 is adhered to the front cover 30a by a double sided tape or adhesive agent (not shown). The speaker unit 33 is disposed adjacent to an upper end of the liquid crystal display unit 32. A connector 34a is mounted on the printed circuit board 34 and electrically connected to the speaker unit 33.

As shown in FIG. 2, the speaker unit 33 has a flexible printed circuit board (FPCB) 33a for electrically connecting the speaker unit 33 to the connector 34a of the printed circuit board 34. The flexible printed circuit board 33a in which a fine circuit is printed on a thin plate of flexible plastic material, and the connector 34a are used as an electric connection for electrically connecting the printed circuit board 34.

A plurality of parts 35 are mounted on the printed circuit board 34 while being electrically connected to one another to transmit and receive electric power and signals to/from one another.

In an exemplary implementation, a buffer member 36, such as a sponge, is disposed on an upper surface of the printed circuit board 34 to prevent the liquid crystal display unit 32 and the plurality of parts 35 of the portable terminal from being damaged by external impact.

However, since the conventional sliding type portable terminal has the structure in that the liquid crystal display unit is mounted on the front cover, the printed circuit board is stacked on an upper surface of the liquid crystal display unit, and the buffer member is stacked on and attached to the upper surface of the printed circuit plate, the thickness of the portable terminal increases, thereby making it difficult to achieve miniaturization and slimness of the portable terminal.

Accordingly, there is a need for an improved portable terminal comprising an overall slimness for reduced thickness.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a slim type portable terminal which includes a printed circuit board arranged side by side with structural parts on a co-planar surface, thereby having a reduced thickness to achieve the slimness thereof.

Another object of exemplary embodiments of the present invention is to provide a slim type portable terminal which includes a buffer member, through which a flexible circuit extends, thereby having a farther reduced thickness to achieve the slimness thereof.

In order to accomplish these objects of exemplary embodiments of the present invention, there is provided a slim type portable terminal including a first housing on which a keypad and a microphone unit are arranged, and a second housing comprising a liquid crystal display unit and a speaker unit a printed circuit board is disposed adjacent to the liquid crystal display unit and arranged side by side with the liquid crystal display unit on a co-planar surface, and a buffer member is attached to an upper surface of the liquid crystal display unit, through which a flexible circuit provided to the terminal extends.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
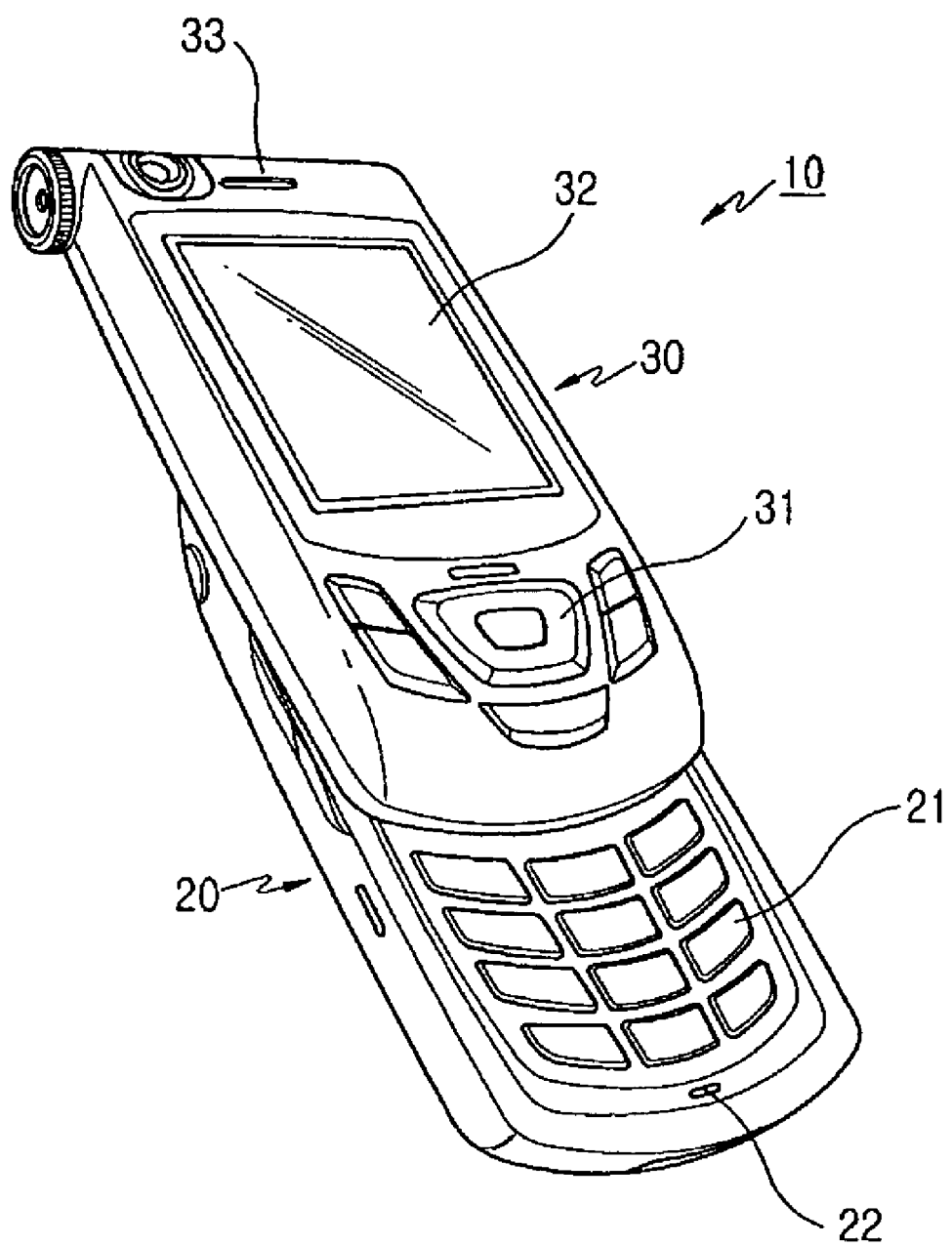
FIG. 1 is a perspective view showing a sliding type portable terminal according to an exemplary embodiment of the present invention, after the sliding movement of the portable terminal.
Figure 2:
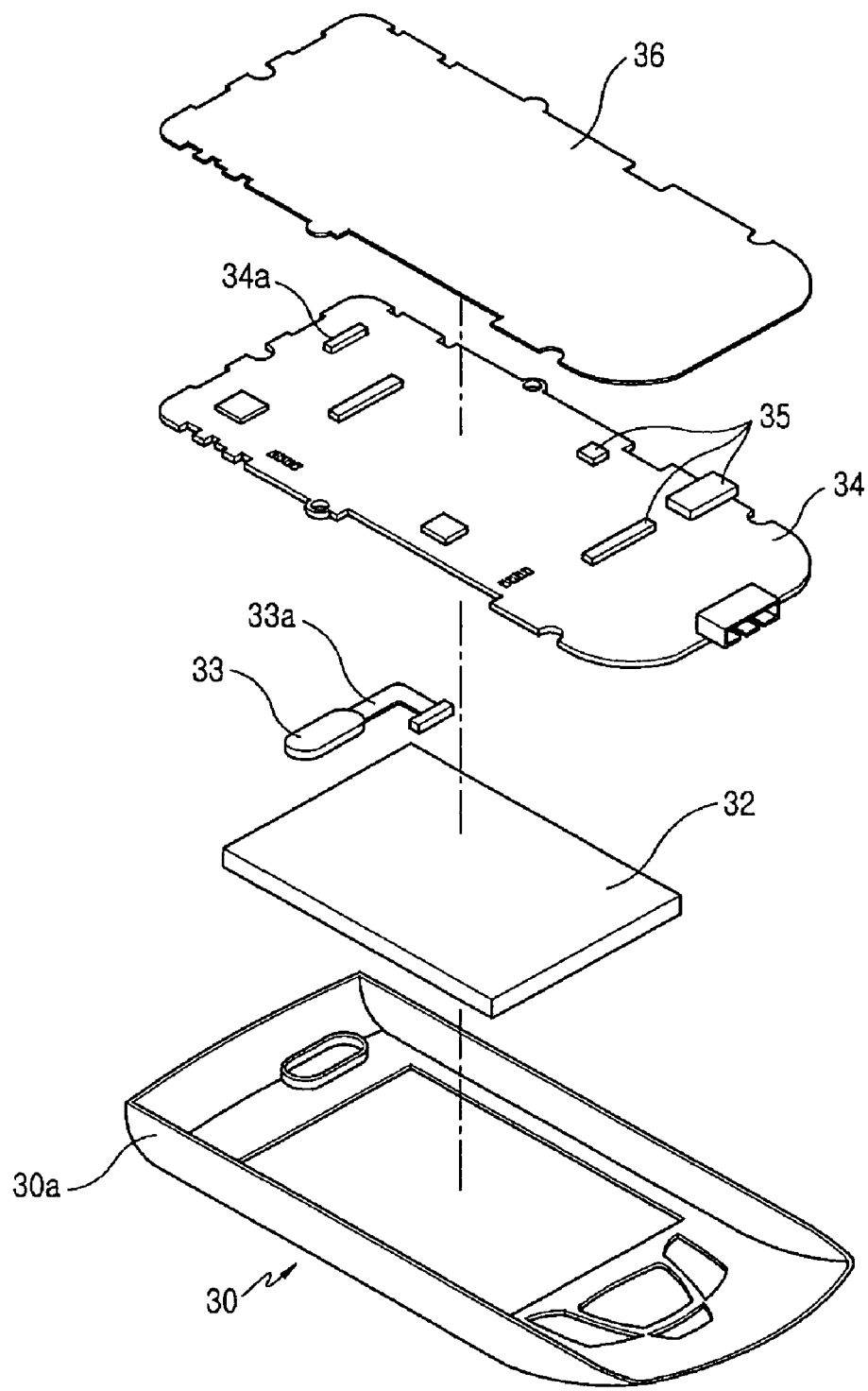
FIG. 2 is an exploded perspective view showing a structure of a sliding housing of the sliding type portable terminal according to an exemplary embodiment of the present invention.
Figure 3:
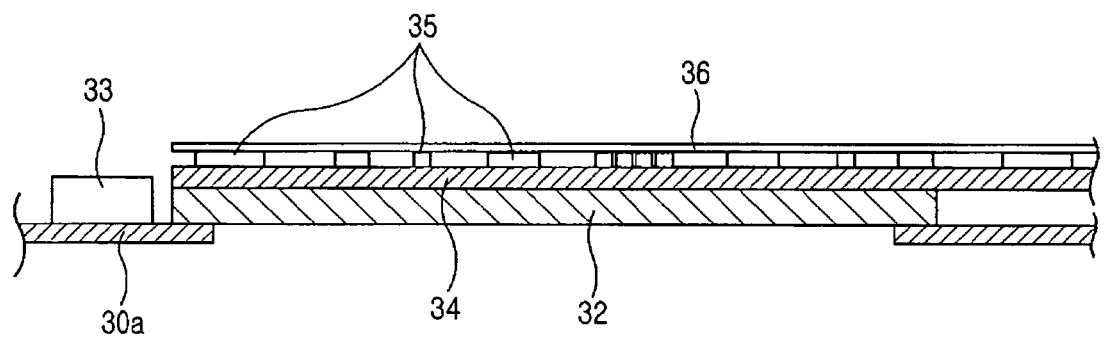
FIG. 3 is a sectional view showing the sliding type portable terminal according to an exemplary embodiment of the present invention, in which a coupling status of the sliding housing is shown.
Figure 4:
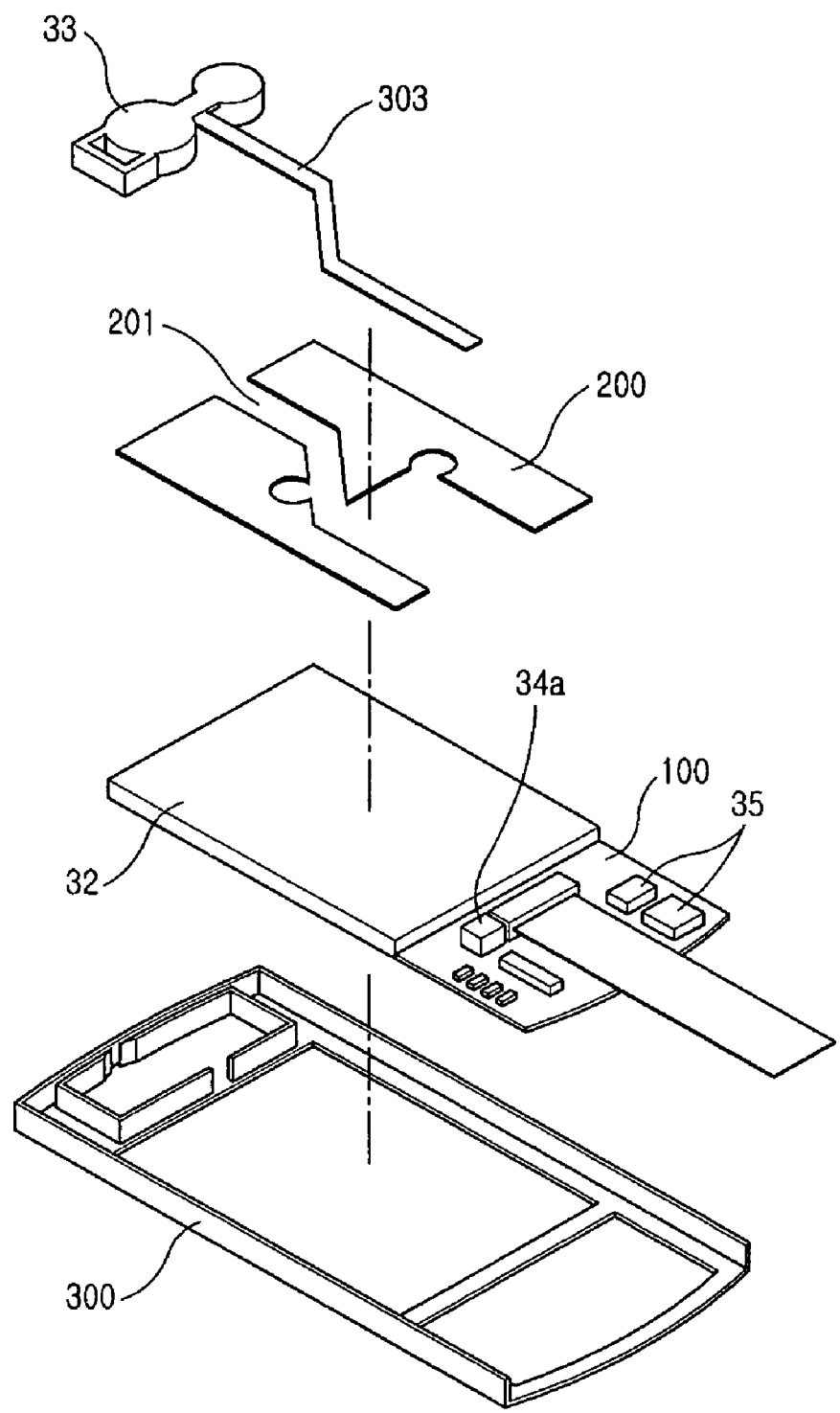
FIG. 4 is an exploded perspective view showing a structure of a slim type portable terminal according to an exemplary embodiment of the present invention.
Figure 5:
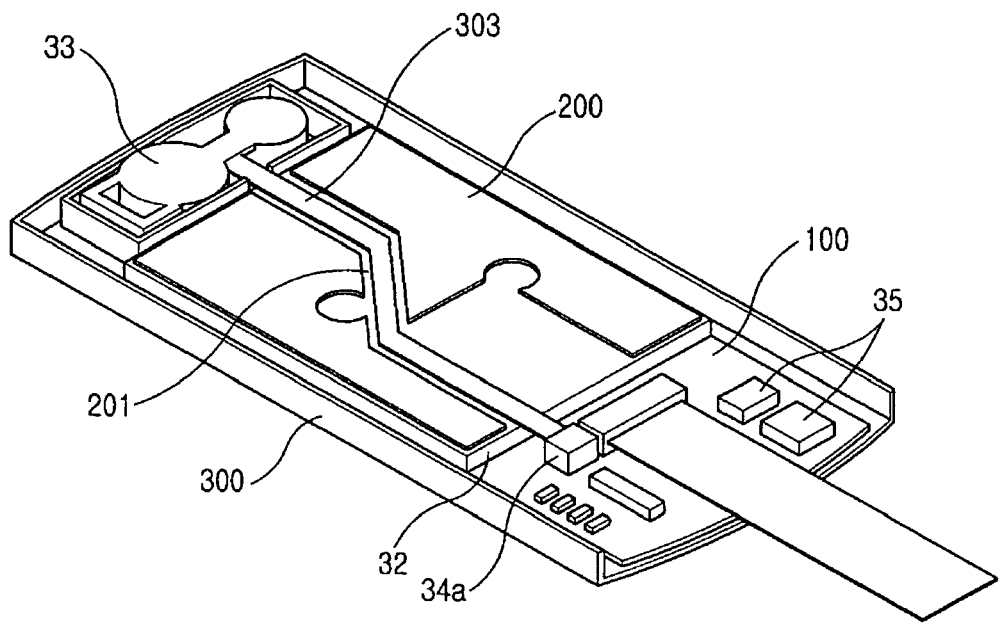
FIG. 5 is a perspective view showing the slim type portable terminal according to an exemplary embodiment of the present invention, in which a coupling status of the portable terminal is shown.

As shown in FIGS. 4 and 5, a portable terminal includes a first housing and a second housing 300. The first housing has a keypad and a microphone unit arranged thereon, while the second housing 300 has a liquid crystal display unit 32 and a speaker unit 33 provided thereon (the first housing, keypad and microphone are not shown).

Figure 6:
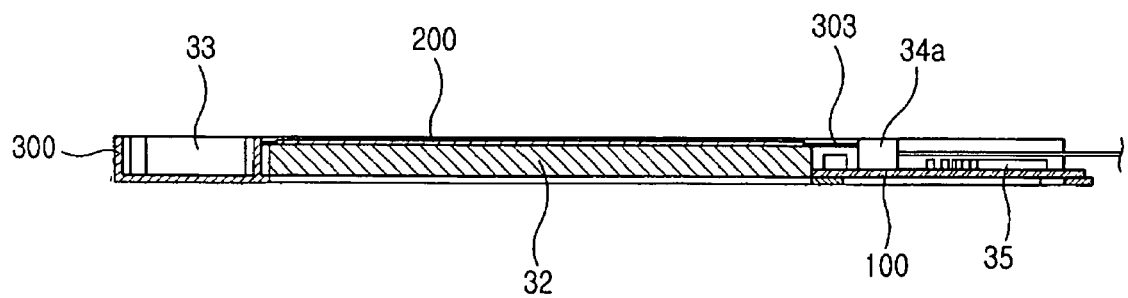
FIG. 6 is a sectional view showing the slim type portable terminal according to an exemplary embodiment of the present invention, in which the coupling status of the portable terminal is shown.

As shown in FIGS. 5 and 6, the slim type portable terminal 100 includes the second housing 300 in which the liquid crystal display unit 32 is seated. The second housing 300 has sides which are disposed near sides of the liquid crystal display unit 32 and extend in parallel to the sides of the liquid crystal display unit 32 on a co-planar surface. The liquid crystal display unit 32 includes a buffer member 200 attached to an upper surface thereof to protect the liquid crystal display unit 32 from external impact, through which a flexible printed circuit board 303 of the terminal 100 extends.

As shown in FIG. 5, the liquid crystal display unit 32 has the speaker unit 33 disposed at a side thereof, and the printed circuit board 100 disposed at another side thereof to be electrically connected to the liquid crystal display unit 32. On the printed circuit board 100, a plurality of connectors 34a and structural parts 35, which are electrically connected to the liquid crystal display unit 32, are mounted on the printed circuit board 100.

The buffer member 200 is attached to the upper surface of the liquid crystal display unit 32 by an adhesive (not shown).

As shown in FIG. 5, the buffer member 200 has a guide groove 201 formed at the center portion thereof to receive a flexible printed circuit board 303 which is connected to the speaker unit 33 and extends through the buffer member 200 while being electrically connected to a connector 34a of the printed circuit board 100.

The printed circuit board 100 has a length which is shorter than that of the liquid crystal display unit 32 so that the terminal can be miniaturized.

Further, the printed circuit board 100 has a structure, according to an exemplary embodiment of the present invention, as follows:

The printed circuit board 100 is disposed at a position near the keypad arranged on the first housing, and aligned side by side with the keypad on a co-planar surface.

The microphone unit is disposed at a side of the keypad, while the printed circuit board 100 is located at another side of the keypad. The microphone unit and the keypad are electrically connected to the printed circuit board.

Hereinafter, the operation of the slim type portable terminal having the above-mentioned structure according to an exemplary embodiment of the present invention will be described in detail with reference to FIGS. 4 to 6.

As shown in FIGS. 4 and 5, the portable terminal 10 includes the first housing and the second housing 300 to which the liquid crystal display unit 32 is provided.

As shown in FIG. 5, the second housing 300 has the printed circuit board 100 arranged adjacent to the liquid crystal display unit 32 side by side on a co-planar surface. The printed circuit board 100 is disposed at the lower portion of the liquid crystal display unit 32, while the speaker unit 33 is disposed at the upper portion of the liquid crystal display unit 32.

In an exemplary implementation, the buffer member 200 is attached by an adhesive (not shown) to the liquid crystal display unit 32, through which the flexible printed circuit board 303 for the speaker unit 33 extends.

As shown in FIGS. 5 and 6, the buffer member 200 has a guide groove 201 formed at the center portion thereof to electrically connect the flexible printed circuit board 303 for the speaker unit 33 to the connector 34a of the printed circuit board 100. Therefore, the flexible printed circuit board 303 for the speaker unit 33 extends through the guide groove 201 after the speaker unit 33 is disposed, and electrically connected to the connector 34a of the printed circuit board 100.

The flexible printed circuit board 303 and the buffer member 200 are mounted to overlap, thereby allowing slimness of the portable terminal.

A plurality of structural parts 35 are mounted on the printed circuit board 100.

Here, the printed circuit board 100 and the liquid crystal display 32 are arranged side by side on the co-planar surface, instead of stacking them, thereby allowing the slimness of the portable terminal.

Hereinafter, a printed circuit board according to an exemplary embodiment of the present invention will be described. The first housing of the terminal has a keypad and a microphone unit arranged thereon, in which the printed circuit board is arranged side by side with the keypad on the co-planar surface. The microphone unit is disposed at a side of the keypad, while the printed circuit board is arranged near a side of the keypad and electrically connected to the microphone unit and the keypad.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A slim type portable terminal comprising a first housing on which a keypad and a microphone unit are arranged, and a second housing comprising a liquid crystal display unit and a speaker unit, the portable terminal comprising:
   a printed circuit board disposed adjacent to the liquid crystal display unit and arranged side by side with the liquid crystal display unit on a co-planar surface; and
   a buffer member attached to an upper surface of the liquid crystal display unit, through which a flexible printed circuit board provided to the terminal extends.

2. The slim type portable terminal as claimed in claim 1, wherein the speaker unit is disposed at a side of the liquid crystal display unit, the printed circuit board is disposed at another side of the liquid crystal display and electrically connected to the liquid crystal display unit and the speaker unit.

3. The slim type portable terminal as claimed in claim 1, further comprising a plurality of connectors and structural parts mounted on the printed circuit board.

4. The slim type portable terminal as claimed in claim 1, wherein the buffer member is attached to an upper surface of the liquid crystal display unit by an adhesive means, and comprises a guide groove formed at a center portion of the buffer member to allow the flexible printed circuit board to extend through the buffer member and electrically connect to a connector of the printed circuit board.

5. The slim type portable terminal as claimed in claim 1, wherein the printed circuit board length is shorter than the length of the liquid crystal display unit.

6. A slim type portable terminal comprising:
   a first housing comprising a keypad and a microphone unit;
   a second housing comprising a liquid crystal display unit and a speaker unit; and
   a printed circuit board disposed adjacent to the keypad, and arranged side by side with the keypad on a co-planar surface.

7. The slim type portable terminal as claimed in claim 6, wherein the microphone unit is disposed at a side of the keypad, the printed circuit board is disposed at another side of the keypad and electrically connected to the keypad and the microphone unit.

8. A portable terminal having a plurality of parts, comprising:
   a printed circuit board disposed adjacent to the plurality of parts and arranged side by side with the plurality of parts on a co-planar surface; and
   a buffer member attached to an upper surface of the plurality of parts through which a flexible printed circuit board provided to the portable terminal extends.

* * * * *